United States Patent [19]

Cocito et al.

[11] 4,274,708

[45] Jun. 23, 1981

[54] DEVICES FOR SPLICING OPTICAL FIBRES AND CABLES

[75] Inventors: Giuseppe Cocito, S. Giusto Can. se Torino; Leonardo Michetti, Almese-Torino, both of Italy

[73] Assignee: Cselt-Centro Studie Laboratori Telecommunication S.p.A., Torino, Italy

[21] Appl. No.: 903,060

[22] Filed: May 5, 1978

[30] Foreign Application Priority Data

| May 10, 1977 | [IT] | Italy | 68043 A/77 |
| Jul. 20, 1977 | [IT] | Italy | 68689 A/77 |
| Jul. 20, 1977 | [IT] | Italy | 68690 A/77 |
| Sep. 5, 1977 | [IT] | Italy | 68970 A/77 |

[51] Int. Cl.³ .................................................. G02B 5/14
[52] U.S. Cl. .................................. 350/96.21; 350/96.22
[58] Field of Search ................. 339/48, 252 R, 258 R, 339/258 RR; 350/96.20, 96.21, 96.22; 174/84 R

[56] References Cited

U.S. PATENT DOCUMENTS

| 3,621,445 | 11/1971 | Horecky et al. | 339/258 R X |
| 3,637,284 | 1/1972 | Plyler | 350/96.20 |
| 3,705,756 | 12/1972 | Keller et al. | 350/96.20 |
| 3,742,430 | 6/1973 | Cairns et al. | 339/252 R |
| 3,748,634 | 7/1973 | Barnes et al. | 339/258 R |
| 3,885,859 | 5/1975 | Dalgleish et al. | 350/96.21 |
| 3,960,531 | 6/1976 | Kohanzadeh et al. | 350/96.21 X |
| 4,049,414 | 9/1977 | Smith | 350/96.21 X |
| 4,077,702 | 3/1978 | Kunze et al. | 350/96.21 |
| 4,110,000 | 8/1978 | Bogar et al. | 350/96.21 |
| 4,139,256 | 2/1979 | Seidler | 339/258 R |
| 4,171,867 | 10/1979 | Cocito | 350/96.21 |
| 4,193,665 | 3/1980 | Arnold | 350/96.22 |
| 4,205,898 | 6/1980 | Matthews et al. | 350/96.21 |

FOREIGN PATENT DOCUMENTS 2363986 7/1975 Fed. Rep. of Germany ........ 350/96.21

Primary Examiner—John K. Corbin
Assistant Examiner—John D. Lee
Attorney, Agent, or Firm—Karl F. Ross

[57] ABSTRACT

Optical-fiber trunks to be spliced are inserted into opposite ends of a downwardly converging longitudinal groove formed at the bottom of a channel member and are held in position by resilient tongues extending into that groove from an overlying retaining member. The latter, made of sheet metal, may be integral with the channel member but could also be a polygonal jacket enveloping an array of channel members accommodating individual fibers of an optical cable to be spliced. Instead of individual channel members so arrayed, an elongate body with several throughgoing channels and associated retaining elements may be used for cable splicing.

18 Claims, 27 Drawing Figures

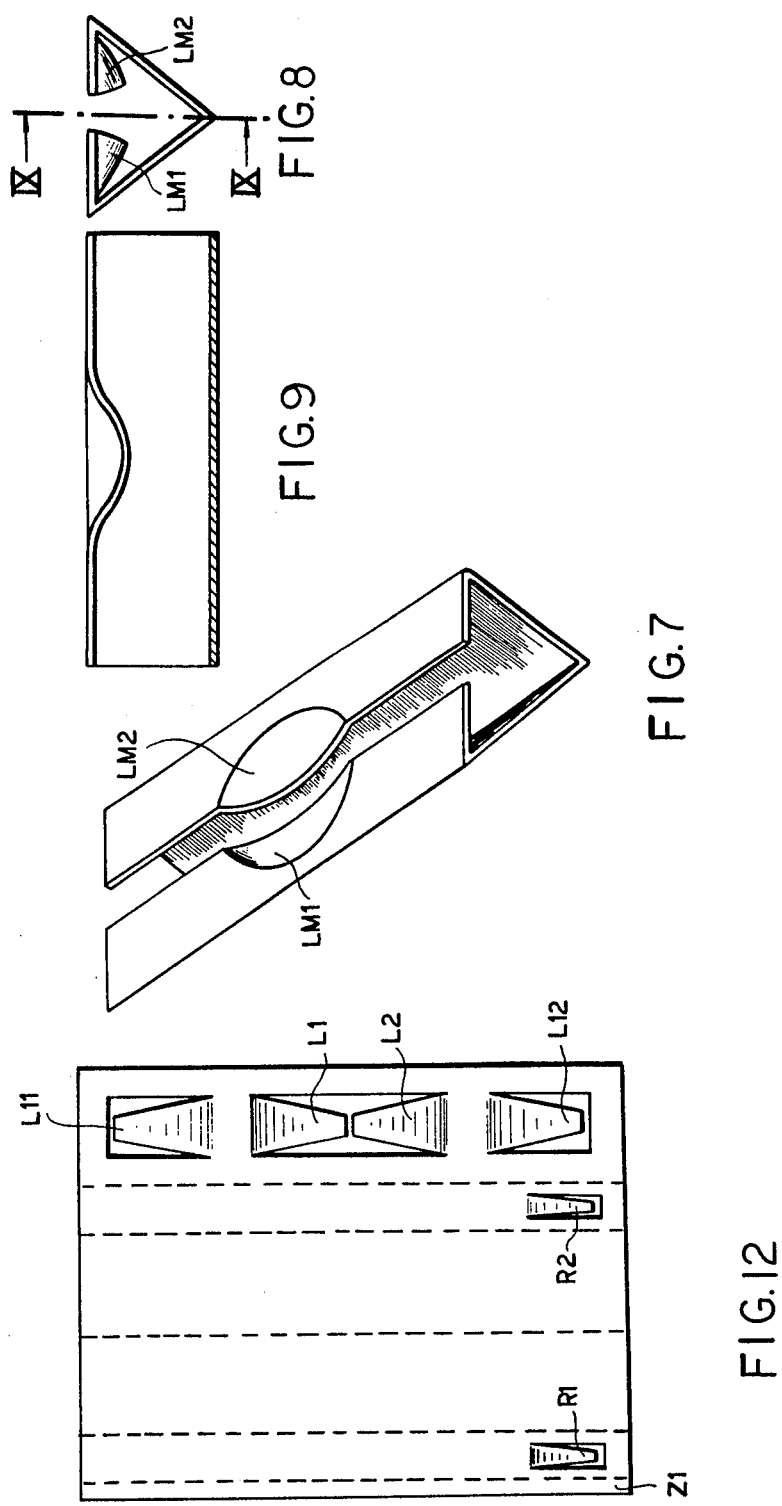

DEVICES FOR SPLICING OPTICAL FIBRES AND CABLES

FIELD OF THE INVENTION

Our present invention relates to devices for splicing optical fibers and cables.

BACKGROUND OF THE INVENTION

To splice optical fibers, either individual or arranged in a cable, it is necessary that the two fiber trunks to be joined together be perfectly aligned, so that the junction may present an attenuation as low as possible; this attenuation is generally due to imperfect parallelism and imperfect alignment of trunk axes, and to a discontinuity of refractive index caused by the medium interposed between their ends.

To solve these problems, conventional splicing devices have downwardly converging guide channels, such as V-grooves or the peripheries of small juxtaposed cylinders, on which fiber trunks may be laid and then held in place by suitable adhesives. Nevertheless, these devices are complex and cannot be easily manufactured, assembled, and manually adjusted for splicing; they furthermore require complex and expensive equipment.

Moreover, such devices have generally sizes depending on the fiber diameter, or do not provide means for holding the trunks in correct position till the adhesive has hardened; some do not allow easy access to the point at which the ends are in contact and where a bonding and/or refractive-index-matching fluid is to be deposited.

OBJECTS OF THE INVENTION

An object of our present invention is to provide a device for splicing optical fibers or cables which is easy to realize and assemble and includes simple and cheap means designed to facilitate the alignment, approach, and retention of trunks of fibers to be spliced and which does not require the use of any additional equipment.

Another object of our invention is to provide a device of this character which may be utilized for splicing optical fibers whose diameters lie in a wide range encompassing for instance all the diameters of optical fibers commercially available at present.

SUMMARY OF THE INVENTION

A fiber-splicing device according to our invention, also referred to hereinafter as a junction element, comprises an elongate channel member of constant cross-section forming a downwardly converging longitudinal bottom groove whose opposite ends are open to enable insertion of respective fiber trunks that are to be joined together. A retaining member of sheet material is fixedly positioned on the channel member, with which it is substantially coextensive at least in the longitudinal direction, and is provided with resilient formations extending toward the bottom groove for engaging the inserted fiber trunks.

Advantageously, the resilient formations of the retaining member include a pair of mutually symmetrical tongues, integral with that member, having free ends pointing toward each other in a longitudinal midplane bisecting the groove of the channel member. These tongues may lie in a cutout of the retaining member enabling the introduction of bonding and/or refractive-index-matching between their free ends.

The groove may be formed, in a manner known per se, by the peripheries of two parallel cylindrical bodies of like diameter disposed alongside each other at the bottom of a casing which is part of the channel member. Alternatively, that groove can be defined directly by converging walls of the channel member which may be a simple dihedral or may be combined with the retaining member into a polygonal prism of sheet material. The retaining member could also be a polygonal jacket enveloping a plurality of dihedral retaining members symmetrically arrayed about an axis to form a body of a cable-splicing device.

BRIEF DESCRIPTION OF THE DRAWING

The above and other features of our invention will now be described in detail with reference to the accompanying drawing in which:

FIGS. 2b and 2c are longitudinal and cross-sectional views respectively taken on the lines IIb—IIb and IIc—IIc of FIG. 2a;

FIG. 7 is a perspective view of a further embodiment;

FIG. 8 is an end view of the device shown in FIG. 7;

FIG. 9 is a longitudinal sectional view taken on the line IX—IX of FIG. 8;

FIGS. 10b and 10c are longitudinal and cross-sectional views respectively taken on the lines Xb—Xb and Xc—Xc of FIG. 10a;

FIGS. 11a, 11b and 11c are views, similar to FIGS. 10a, 10b and 10c, of another modification, FIGS. 11b and 11c being respectively taken on the lines XIb—XIb and XIc—XIc of FIG. 11a;

FIG. 12 is a face view of a blank representing the device of FIGS. 10a, 10b and 10c in developed form;

FIG. 13b is a cross-sectional view taken on the line XIIIb—XIIIb of FIG. 13a;

FIG. 14b is a cross-sectional view taken on the line XIVb—XIVb of FIG. 14a;

FIG. 15b is a cross-sectional view taken on the line XVb—XVb of FIG. 15a;

SPECIFIC DESCRIPTION

Figure 1:
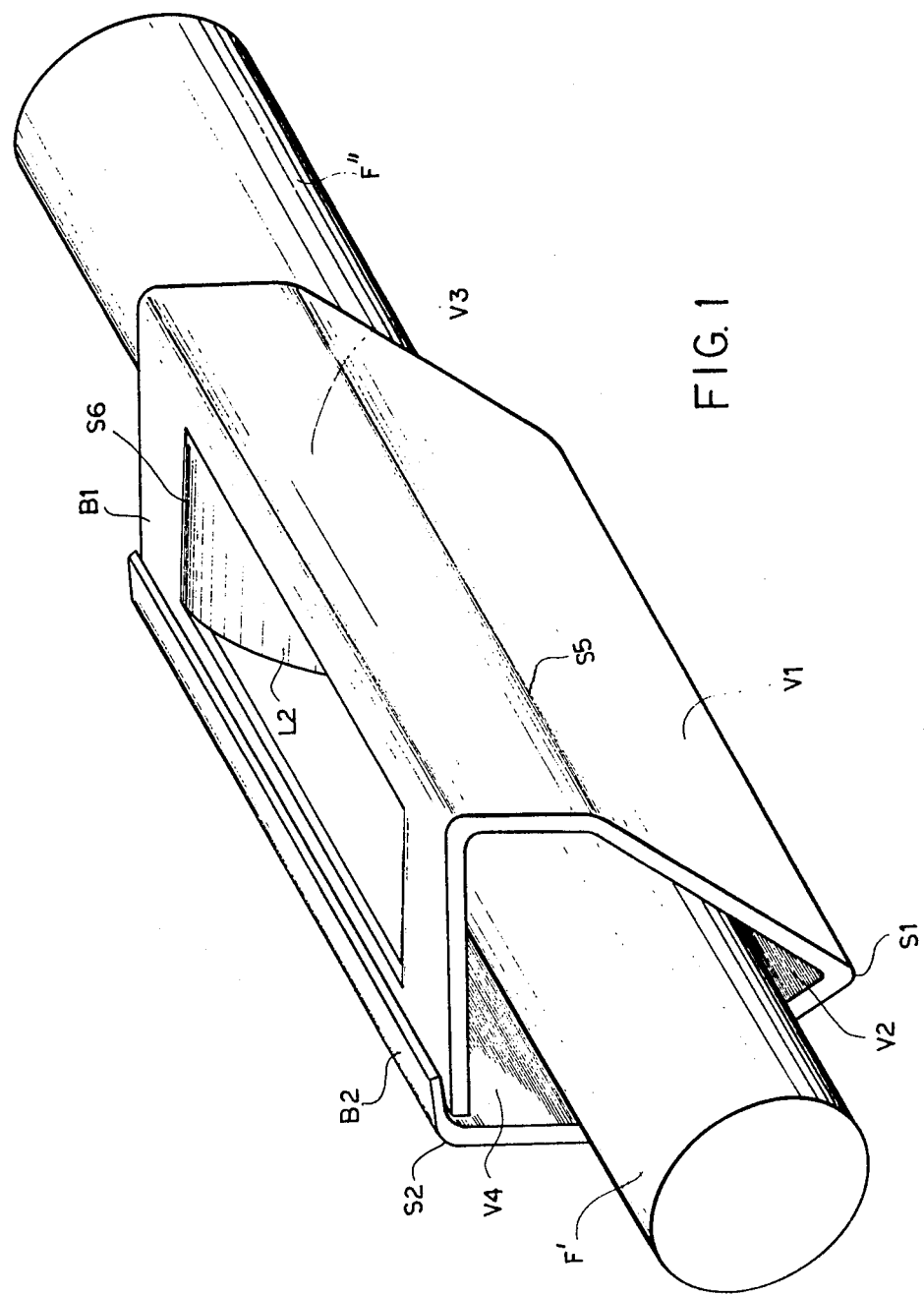
FIG. 1 is a perspective view of an individual junction element according to our invention.
Figure 2C:
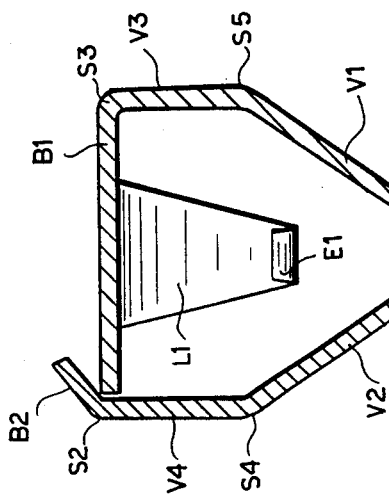
Figure 2B:
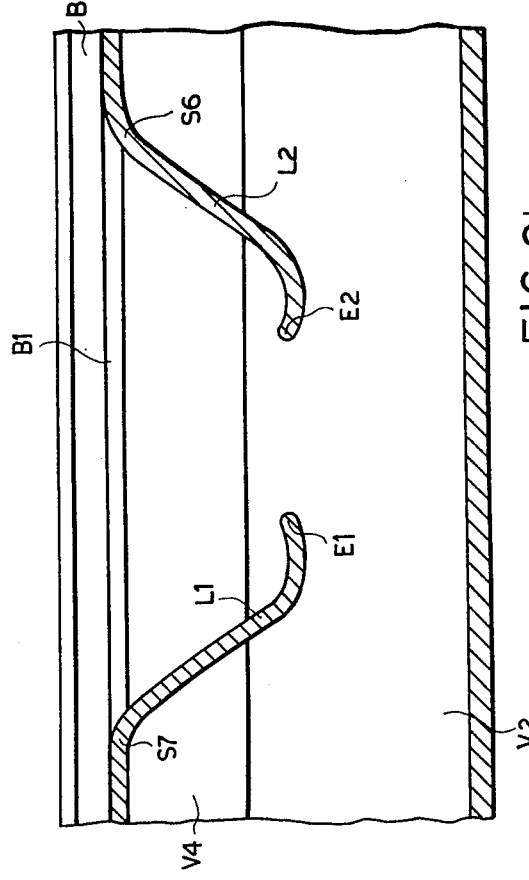
Figure 2A:
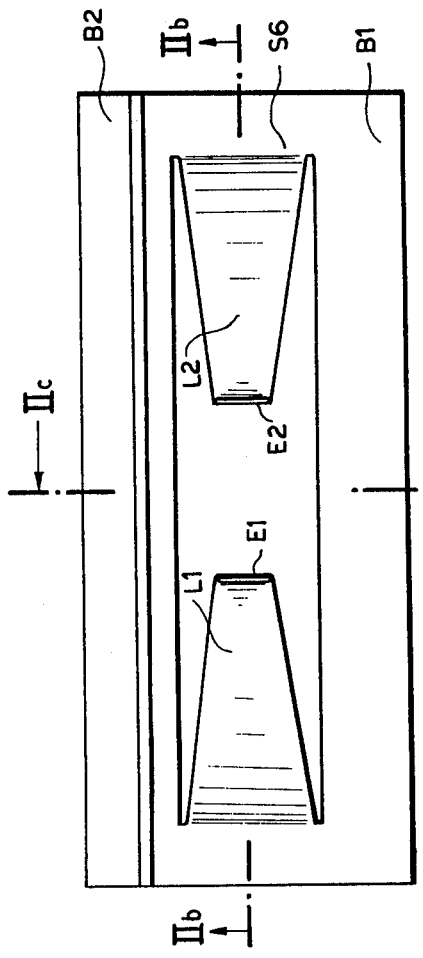
FIG. 2a is a top plan view of the device shown in FIG. 1.
Figure 3:
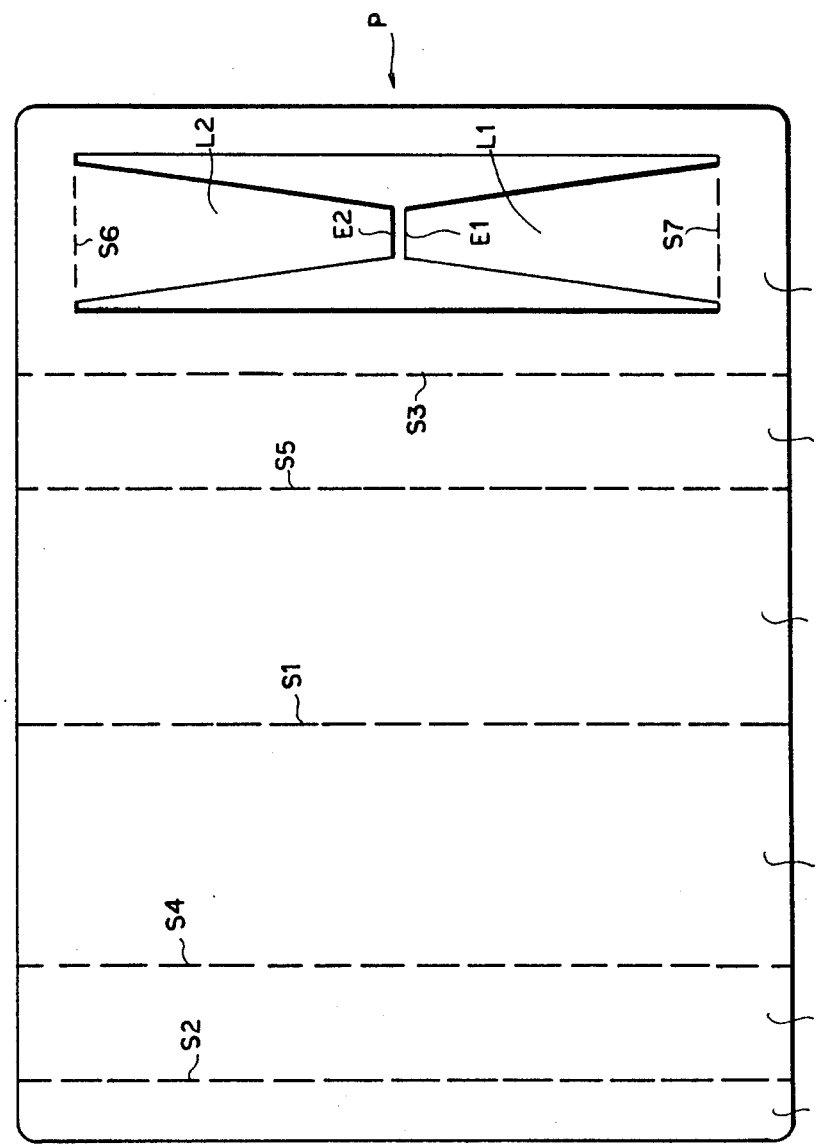
FIG. 3 is a face view of a blank representing the device of FIG. 1 in developed form.

In the embodiment of FIGS. 1–3 the device according to our invention comprises a container C, shaped like a hollow and open-ended prism, into whose ends trunks F' and F" of the fiber to be spliced have been inserted.

In this embodiment the prism has five faces V1, V2, V3, V4, B1, with edges S1, S2, S3, S4, S5 and a lip B2 overlapping face B1 for closure of the container. The acute dihedral formed by faces V1, V2 constitutes a V-guide for the alignment of the two fiber trunks F', F" to be spliced.

Face B1 is cut so as to form two resilient tongues or springs L1, L2 which point toward each other and penetrate into the V-guide to hold down the fiber trunks F', F"; these springs, owing to their resiliency, adapt themselves to the diameter of the fiber and hold the trunks in correct position till the adhesive which is poured on the junction point is hardened.

It is worth noting that the two parallel faces V3, V4 only serve to make the container less cumbersome and are therefore not essential to the device which might be shaped like a triangular prism basically consisting of diverging faces V1, V2 and top face B1.

As best seen in FIG. 2b, springs L1, L2 are connected by means of folds S7, S6 to face B1 and their ends E1, E2 are free to oscillate inside the V-guide; these free ends are slightly turned up toward the broad side of the V-guide so as to prevent damaging the outer surface of fiber trunks which are inserted between these springs and the guide groove.

In FIGS. 2a and 2c the springs L1, L2 are shown to have a substantially trapezoidal shape, but obviously any other suitable shape could be used, for instance a rectangular outline.

In FIG. 3 we have shown a blank sheet P from which the splicing device described above is cut out.

Dotted lines S1, S2, S3, S4, S5 denote the folding traces of the sheet giving rise to the corresponding designated edges of prismatic container C and bounding the zones V1, V2, V3, V4, B1 which become the corresponding faces of container C.

The sheet P, preferably made of metal, may have lateral dimensions on the order of ten millimeters.

Zone B1 is cut so as to present the two springs L1, L2, which are subsequently bent down along the crease lines S6, S7; ends E1, E2 of these springs are slightly curled up, as already mentioned.

To splice optical fibers by means of the device described above it is sufficient to manually insert the two fiber trunks from opposite guide ends until the confronting ends of these trunks are in contact; at this point, a drop of adhesive having a suitable refractive index may be poured onto the contact point, so as to secure the two fiber trunks together.

Figure 4:
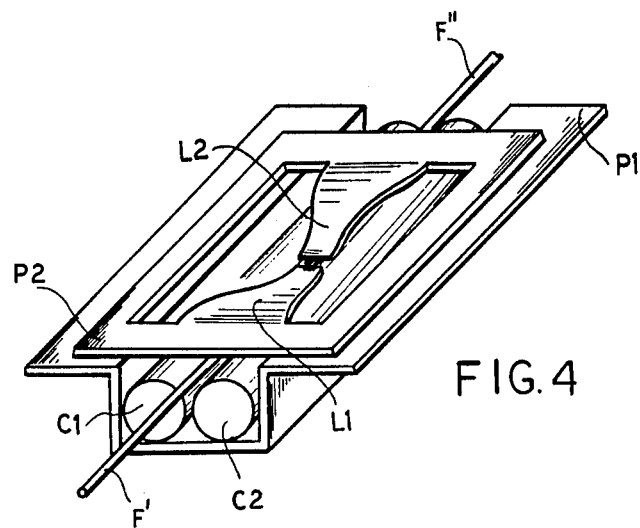
FIGS. 4, 5 and 6 show another embodiment of a fiber-splicing device according to our invention in perspective view, cross-section and longitudinal section, respectively.
Figure 5:
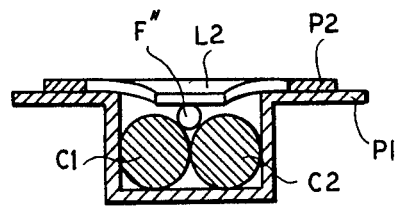
Figure 6:
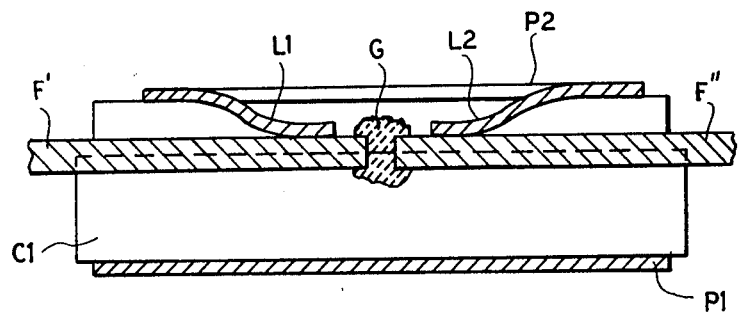

In the embodiment of FIGS. 4–6 the device according to our invention comprises a container constituted by two small cut and shaped plates P1 and P2 and by two small juxtaposed cylinders C1 and C2 designed to hold fiber trunks F', F" in axial alignment within a downwardly converging groove formed between them.

The lower plate P1 is so shaped as to define a U-channel having a width suitble for the correct positioning of cylinders C1 and C2 alongside each other.

More particularly, the base of the channel has a width substantially equal to the sum of the diameters of the two cylinders and a height such as to facilitate the insertion of the fiber inside the guide groove formed by the peripheral surfaces of cylinders C1 and C2.

The lateral faces of the U-channel have at the top two outward-projecting parts in the shape of coplanar shelves supporting upper plate P2 which forms the holding springs L1, L2 whose functions have already been disclosed.

Plate P2 is obtained by cutting or by photoengraving a plane rectangular sheet made of a material having suitable resiliency characteristics.

The two fiber trunks laid inside the upper groove formed by the two lateral surfaces of cylinders C1, C2 contact same along two generatrices thereof and are held down by the free ends of tongues L1, L2.

As best seen in FIG. 6, the cylinder diameter—although not strictly dependent on the fiber diameter—is such that, when the trunk is positioned inside the guide groove, the plane tangent to cylinders C1, C2 at their top intersects the fiber so that the holding springs L1, L2 do not touch the cylinders after insertion of the fiber trunks but rest only on the latter; the generatrices along which cylinders and fiber trunks contact each other are only slightly spaced apart. More particularly, the distance of these generatrices is significantly smaller than the fiber diameter; thus, the fiber trunks are easily introduced into the guide.

For proper operation the cylinders C1 and C2 must have polished and preferably dark-colored (for instance blued) surfaces. Thus, visual inspection of trunk ends during their insertion into the guide may be helpful for their correct centering in the splicing device; if the cylinders present a contrasting background, the fiber may be more easily observed.

While the device is being assembled, the cylinders C1 and C2 are secured at the bottom of the channel of plate P1 in any suitable way whereupon plate P2 is secured to the upper extensions of plate P1 so that holding springs L1 and L2 project into the device.

The container of FIGS. 4–6 may consist either of two plates P1 and P2, as shown, or of one plate only which may be precut so as to form the two holding springs and afterwards shaped to define the U-channel enveloping the cylinders, folded to present the upper face provided with the springs, and finally closed along an edge by crimping or soldering.

The inserted fiber trunks F' and F" may be bonded to each other by means of a drop G of adhesive of suitable refractive index, as illustrated in FIG. 6.

In FIGS. 7–9 we have shown a unitary splicer obtained without cutting from a rectangular sheet by simply folding same about three parallel lines to produce the V-groove and the face opposite thereto, the latter being subdivided into two spaced-apart halves designed to impart the necessary resiliency to the device. The tongue-shaped springs of the precedinng embodiments have been replaced in this instance by two depressions LM1, LM2 midway along the confronting edges of the two symmetrical parts of that face; the convex surfaces of the depressions exert a downward pressure on fiber trunks placed in the V-groove of the trough-shaped structure.

If a better holding is required, more depressions suitably separated from one another can be provided.

Figures 10B, 10C:
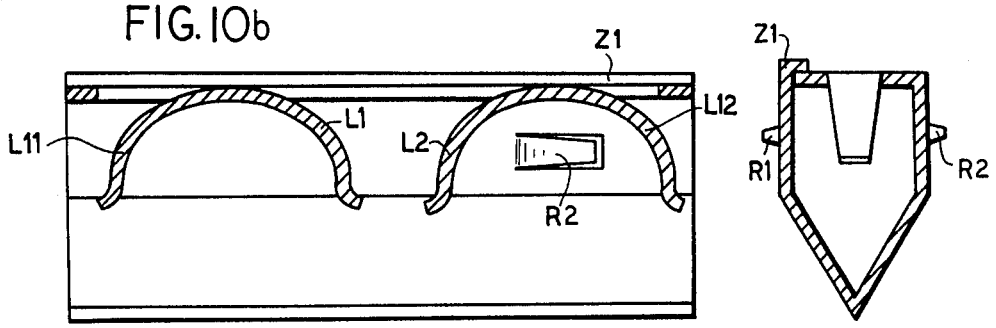
Figure 10A:
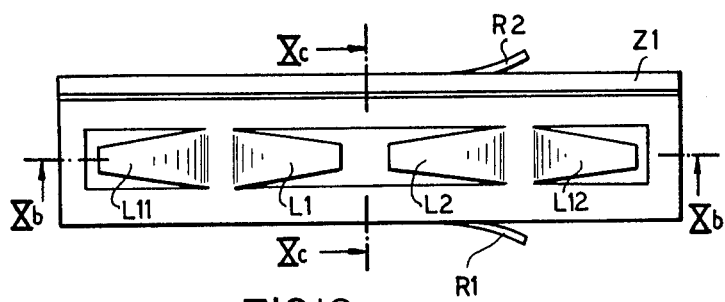
FIG. 10a is a top plan view, similar to FIG. 2a, of a modified junction element.

In the embodiment of FIGS. 10a, 10b and 10c, springs L1 and L2 pointing toward each other as in FIGS. 1–6 have been supplemented by a pair of oppositely pointing springs L11 and L12 in order to ensure a more precise alignment of fiber trunks to be spliced.

This is of particular importance in the case of semipermanent splices, i.e. when no adhesive is used, with only a drop of a liquid of suitable refractive index possibly interposed between the trunks placed end-to-end, and generally whenever the fiber undergoes mechanical pulling and twisting strains.

Two further springs or tongues R1, R2 projecting laterally outward from the container body hold the device in position when the latter is inserted along with other, similar devices in a junction block to form an assembly for splicing optical cables, as will be described hereinafter. A blank used for making the device of FIGS. 10a–10c is shown in FIG. 12; a strip zone Z1 of this blank forms a closure lip overlapping the slotted upper face as best seen in FIG. 10c.

Figures 11B, 11C:
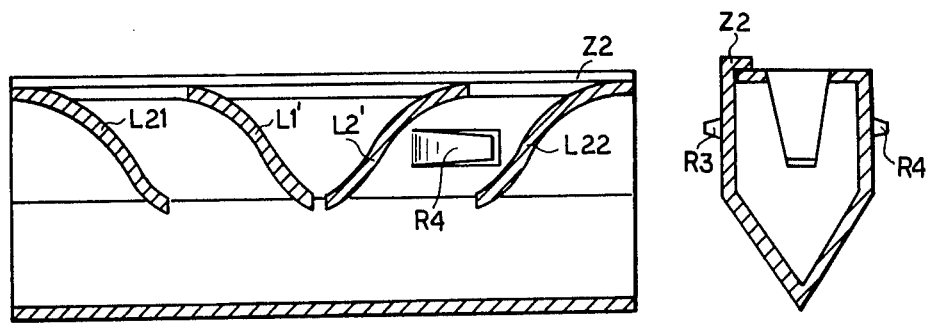
Figure 11A:
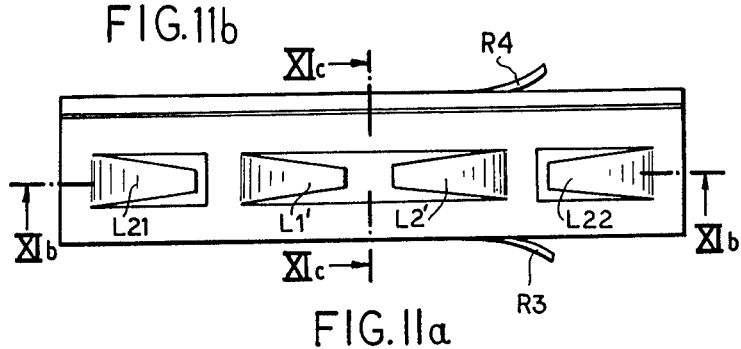

An analogous splicer for a single optical fiber is represented in FIGS. 11a, 11b and 11c. Here, outer springs L21, L22 point toward each other, the same as the inner springs L1', L2' bracketed thereby.

As between these two last embodiments, that of FIGS. 10a–10c offers a wider holding base for fiber trunks whereas that of FIGS. 11a–11c is designed for more delicate optical fibers for which a very strong holding force is not required but where easier insertability is desirable.

Obviously, the number of holding springs and of detents (designated R3, R4 in FIGS. 11a–11c) may be greater than illustrated and these springs and tongues may be differently oriented.

The closure of the prismatic container body may be obtained by different mechanical joints, by soldering, or by using metallic or thermoshrinkable plastic sheets. The closure lip has been designated Z2 in FIGS. 11a–11c.

Figure 13A:
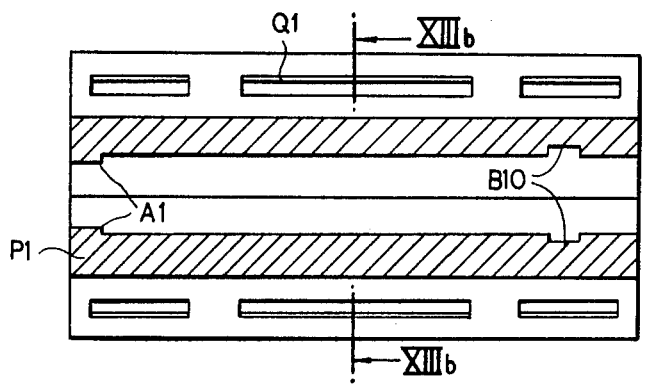
FIG. 13a is a slide view, partly in section, taken on the line XIIIa—XIIIa of FIG. 13b, of a splicer for optical cables according to our invention.
Figure 13B:
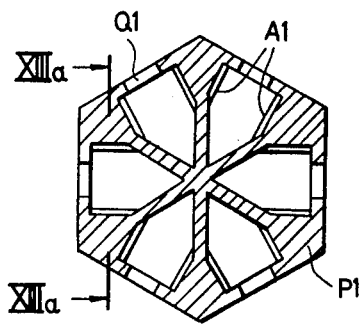

FIGS. 13a and 13b show a block P1 shaped like a straight hexagonal prism and designed to contain in its six inner cavities a corresponding number of individual splicers or junction elements for single optical fibers, here particularly containers of pentagonal cross-section as illustrated in FIGS. 1, 2a, 10c and 11c, in order to provide an assembly for splicing optical cables.

Block P1 may be made of metal, synthetic material or any other suitable substance, in accordance with conventional techniques, and may be inserted in a protective prismatic or cylindrical housing having means for pressure-sealing the cable ends.

An example of such a housing is described in copending U.S. patent application Ser. No. 853,851 filed Nov. 22, 1979 by one of us, Giuseppe Cocito, now U.S. Pat. No. 4,171,867.

FIG. 13a shows the constructional details of the block P1, including shoulders A1, limiting the leftward movement of individual junction elements for single fibers upon insertion thereof from the right, and notches B10, designed to receive detents such as the tongues R1, R2, R3, R4 shown in FIGS. 10a, 10b, 10c, 11a and 11b cut out in parallel faces of inserted junction elements to prevent their rightward withdrawal. Slots Q1 give access to the holding springs of the junction elements inserted in the block in order to let the adhesive of suitable refractive index (G, FIG. 6) be deposited between fiber trunks.

In this particular embodiment we have chosen six cavities but, evidently, the number of such cavities may be greater or smaller, in dependence upon the vertex angle of the V-grooves, and their cross-section may be shaped as a polygon having a number of sides other than five, according to the type of individual junction elements employed. Obviously the block may have, if required, cylindrical rather than prismatic shape.

Figure 14B:
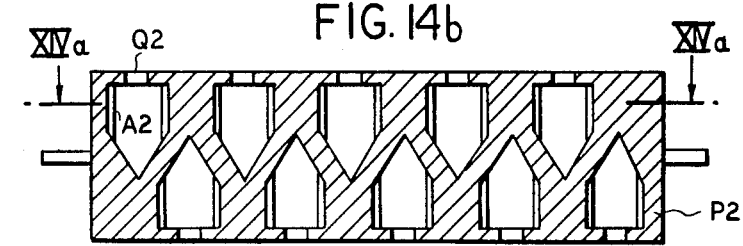
Figure 14A:
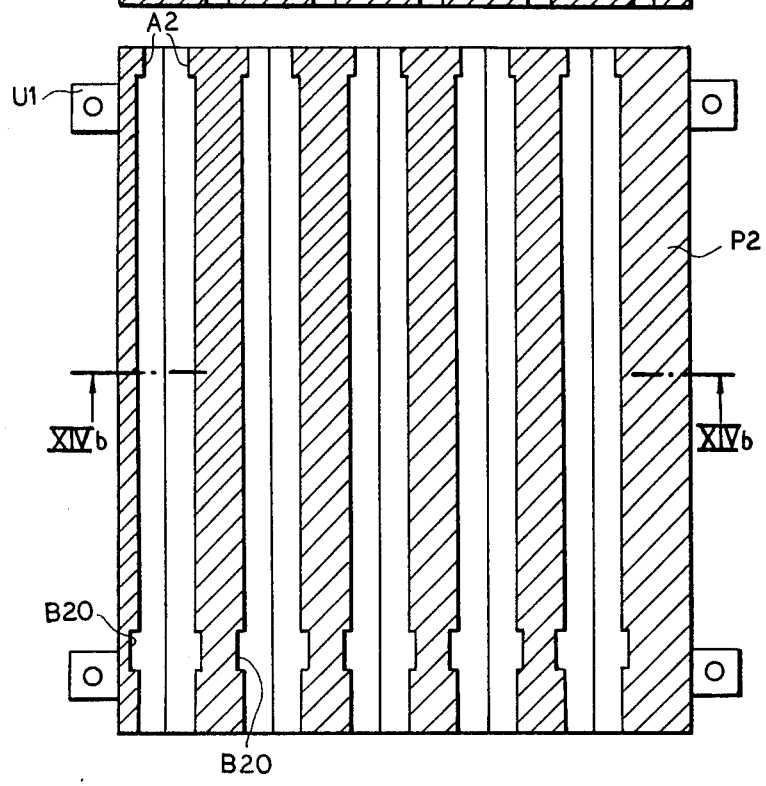
FIG. 14a is a sectional top view, taken on line XIVa—XIVa of FIG. 14b, of another cable splicer according to our invention.

FIGS. 14a and 14b show a block P2 in the shape of a straight parallelipiped containing ten cavities arranged in two tiers accommodating oppositely facing junction elements for single optical fibers.

Block P2 may be made of metal, of synthetic material or of any other suitable substance according to known methods; it may be provided with lugs U1 for securing it either onto supports or inside a protective housing such as that described in the aforementioned copending application Ser. No. 853,851. Such a device has proved to be particularly adapted for splicing optical cables in which fibers are located side by side on the same plane.

As seen in FIG. 14b, the V-groove of the cavities in the two tiers are interleaved and point in opposite directions.

Shoulders A2, notches B20 and slots Q2 are analogous to formations A1, B10 and Q1 already described with reference to the block shown in FIGS. 13a and 13b.

In the embodiment of FIGS. 14a and 14b, again, the number of cavities and of tiers as well as the cross-sections of these cavities may be different from those illustrated.

It is to be noted that when several individual splicing or junction elements are combined in a block similar to those described with reference to FIGS. 13a, 13b and 14a, 14b, closure lips such as those shown at B2, Z1, Z2 in preceding Figures may also be omitted, thanks to the retentive effect of the cavity wells of the block contacting the element inserted thereinto.

Figure 15A:
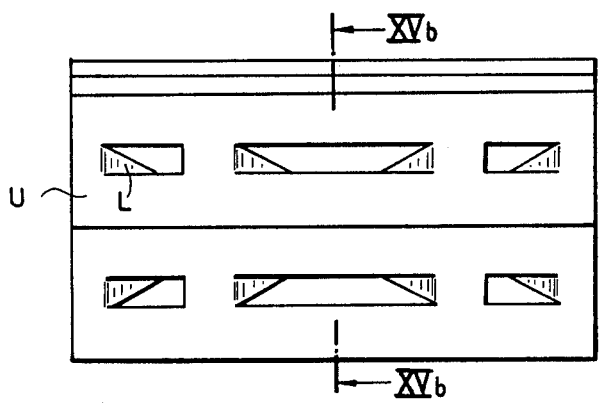
FIG. 15a is a side view of a further cable splicer embodying our invention.
Figure 15B:
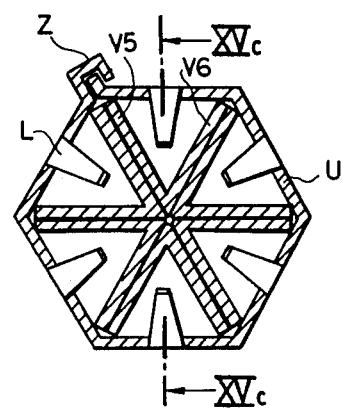
Figure 15C:
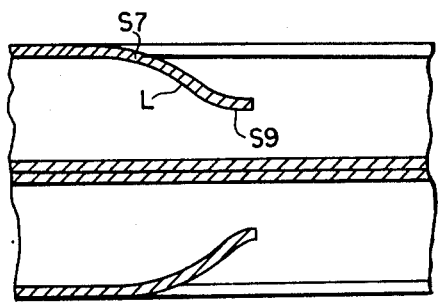
FIG. 15c is a fragmentary longitudinal sectional view taken on line XVc—XVc of FIG. 15b.
Figure 16:
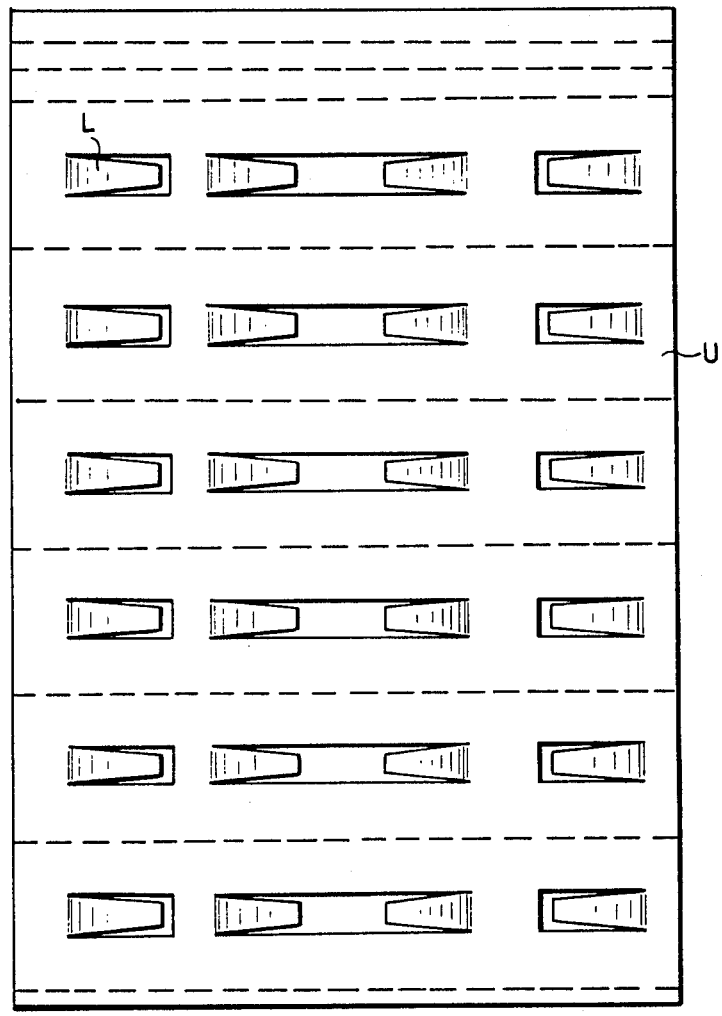
FIG. 16 is a face view of a blank representing the device of FIGS. 15a, 15b and 15c in developed form.
Figure 17:
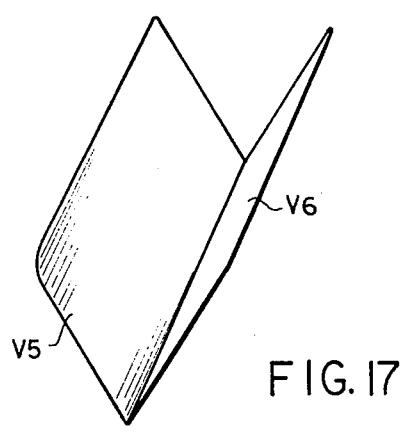
FIG. 17 is a perspective view of a dihedral forming part of the last-mentioned device.

The device for splicing optical cables shown in FIGS. 15a, 15b, 15c basically consists of a polygonal jacket U enveloping six V-guides. Jacket U, besides holding the V-guides in their centrally symmetrical position, forms the resilient tongues L holding the fiber trunks to be spliced; each V-guide is formed by faces V5, V6 of an acute dihedral with a vertex at the center of the polygon (see also FIG. 17). The tongues L, with bends S7 and free ends S9 as shown in FIG. 15a, are arrayed within each V-guide in two pairs similar to those illustrated in FIGS. 11a and 11b; the jacket U with its tongue L has been shown in FIG. 16 as a flat sheet which is subsequently bent, at the crease lines shown dotted in that Figure, to form the polygonal structure of FIG. 15c. The latter Figure also indicates that the shape of the polygon is maintained by crimping at Z; mechanical fasteners, soldering, or insertion into a metallic or heat-shrinkable plastic sheath may also be used for this purpose. The orientation of the tongues L could be modified in accordance with the showing of FIG. 10a, for example.

What we claim is:

1. A device for the splicing of optical fibers, comprising:
    an elongate channel member of constant cross-section forming a downwardly converging longitudinal bottom groove with opposite open ends for the insertion of respective fiber trunks to be joined together; and
    a retaining member of sheet material fixedly positioned on said channel member and substantially longitudinally coextensive therewith, said retaining member being provided with a slot and with a pair of resilient formations extending from opposite boundaries of said slot toward said groove for engaging the inserted fiber trunks while being sufficiently separated to facilitate the introduction therebetween of bonding and refractive-index-matching material into said groove.

2. A device as defined in claim 1 wherein said formations include a pair of mutually symmetrical tongues integral with said retaining member with free ends pointing toward each other in a longitudinal midplane bisecting said groove.

3. A device as defined in claim 2 wherein said tongues are generally S-shaped with broad faces tapering toward said free ends.

4. A device as defined in claim 1, 2 or 3 wherein said channel member comprises a flat-bottomed casing and a pair of parallel cylindrical bodies of like diameter disposed alongside each other at the bottom of said casing and spacedly overlain by said formations, said groove being formed between the peripheries of said bodies.

5. A device as defined in claim 4 wherein said bodies are darkly stained.

6. A device as defined in claim 3 wherein said free ends are turned upward away from said groove.

7. A device as defined in claim 2 wherein said formations include two other mutually symmetrical tongues in said midplane bracketing said pair.

8. A device as defined in claim 1, 2, 3, 6, or 7 wherein said retaining member is part of an envelope surrounding said channel member.

9. A device as defined in claim 1 wherein said slot is a longitudinal gap directly above and parallel to said groove, said formations including downward bulges in confronting edges of said retaining member bounding said gap.

10. A device as defined in claim 1, 2, 3, 6, 7 or 9 wherein said channel member consists of sheet material and is unitary with said retaining member.

11. A device as defined in claim 10 wherein said channel and retaining members are part of a flat blank bent about a plurality of parallel crease lines into a polygonal prism.

12. A device for the splicing of optical cables, comprising:

an elongate body of constant cross-section formed with a plurality of throughgoing longitudinal channels each having a V-shaped groove extending from one end of said body to the other, said body being provided with peripheral slots extending longitudinally of said channels and giving access thereto midway between the ends thereof; and resilient retaining means in each of said channels extending toward said groove thereof for engaging a pair of fiber trunks inserted into said groove from opposite ends thereof, said retaining means including a pair of tongues extending from the ends of each slot toward each other with spaced-apart tips facilitating the introduction therebetween of bonding and refractive-index-matching material into the respective groove.

13. A device as defined in claim 12 wherein said channels are juxtaposed in a plurality of tiers.

14. A device as defined in claim 13 wherein the grooves of adjacent tiers are interleaved and point in opposite directions.

15. A device as defined in claim 12, 13 or 4 wherein said body comprises a hollow block and a plurality of polygonal channel members of sheet material inserted in said block, said channel members and said block being provided with coacting detent means for holding the inserted channel members in position therein.

16. A device as defined in claim 12 wherein said body is centered on an axis about which said channels are symmetrically arrayed, the groove of each channel pointing toward said axis.

17. A device as defined in claim 16 wherein said body consists of a plurality of closely juxtaposed dihedral channel members complementing one another to form a polyhedron enveloped by a polygonal jacket of sheet material closed upon itself, said retaining means being formations integral with said jacket.

18. A device as defined in claim 12, 13, 14 or wherein said channels are of polygonal cross-section.

* * * * *